United States Patent [19]

Saito

[11] 4,297,803
[45] Nov. 3, 1981

[54] COMPOSITION USEFUL FOR INHIBITING ADHESION AND PROPAGATION OF UNDESIRABLE ALGAE AND/OR SHELLFISH ON ARTICLES

[76] Inventor: Norio Saito, No. 1019 Shimizudani, Takatori-cho, Takaichi-gun, Nara-ken, Japan

[21] Appl. No.: 130,590

[22] Filed: Mar. 14, 1980

[30] Foreign Application Priority Data

Mar. 16, 1979 [JP] Japan .................................. 54-31327

[51] Int. Cl.³ ............................................ A01K 74/00
[52] U.S. Cl. ........................................... 43/7; 422/6; 424/250; 424/288; 424/303; 424/346; 424/347; 427/385.5; 427/388.5; 427/389.9; 427/393.6; 428/255; 428/907; 525/369; 526/240

[58] Field of Search ..................... 422/6, 7, 12, 13, 37; 106/18.34, 18.35, 18.32; 428/907, 255; 427/388.5, 394, 396, 393.6, 434.6, 389.9, 39, 385.5; 424/250, 288, 303, 346, 347; 71/65, 66, 67, 79, 85, 92, 97; 43/7; 87/1, 13; 525/369, 332, 344; 526/240

[56] References Cited

U.S. PATENT DOCUMENTS

| | | | |
|---|---|---|---|
| 3,222,158 | 12/1965 | Sowa | 71/67 X |
| 3,322,734 | 5/1967 | Rees | 525/326 |
| 3,461,132 | 8/1969 | Schroder et al. | 424/288 X |
| 3,552,945 | 1/1971 | Plonsker et al. | 71/97 |
| 3,883,530 | 5/1975 | Bublitz | 424/250 X |

*Primary Examiner*—Michael R. Lusignan
*Assistant Examiner*—Thurman K. Page
*Attorney, Agent, or Firm*—Berman, Aisenberg & Platt

[57] ABSTRACT

A composition useful for inhibiting adhesion and propagation of undesirable algae and/or shellfish on articles, which comprises triisobutyltin hydroxide, an arylsulfonic acid derivative and an organic solvent. The composition may further comprise a phenol substituted by an alkyl radical and a chlorine atom and/or a pyridazine derivative. A method of using the composition is also disclosed.

14 Claims, No Drawings

COMPOSITION USEFUL FOR INHIBITING ADHESION AND PROPAGATION OF UNDESIRABLE ALGAE AND/OR SHELLFISH ON ARTICLES

The present invention relates to a composition, and the use of such composition, useful for inhibiting adhesion and propagation of undesirable algae and/or shellfish on various articles, which comprises triisobutyltin hydroxide and an arylsulfonic acid derivative and an organic solvent.

It is often observed that undesirable algae and/or shellfish stick to propagate on various articles, for example, a fixed fishing net used in a fishery. These undesirable algae and/or shellfish adversely affect the growth of fish or shellfish to be harvested.

In order to overcome the drawbacks, various fishing nets specifically processed with a special agent have been hitherto proposed. However, the prior art encounters various drawbacks. For example, an active component contained in the agent which has been incorporated in a net and can keep undesirable algae and/or shellfish away from the net is hydrolyzed and liberated from the net as time passes. The liberation of the active component from the net into the environmental water is also undesirable from the viewpoint of environmental pollution.

The applicant disclosed, in Japanese Patent Publication No. 126250/1979 (unexamined), a synthetic high polymer resistant to corrosion, mustiness, algae and insect damage, which contains at least one compound selected from the group consisting of a compound of the formula:

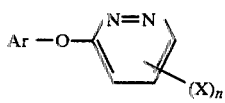

a compound of the formula:

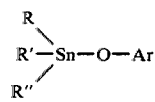

and a compound of the formula:

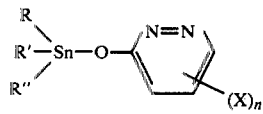

wherein Ar is an aryl radical substituted by one or more substituents selected from the group consisting of a halogen atom and a lower alkyl radical; each X independently represents a halogen atom, lower alkyl or hydroxyl radical; each R, R' and R", which are identical or different, represents a lower alkyl radical; and n is an integer of from 1 to 3, said lower alkyl radical having not more than 5 carbon atoms. The applicant has found that a fishing net made of said synthetic high polymer could be used in a fishery without a possibility that undesirable algae and/or shellfish may stick and propagate thereon and that the active compound may be liberated therefrom. Further and extended research based on this finding led us to the present invention.

According to the present invention, a composition is provided for inhibiting adhesion to and propagation of undesirable algae and/or shellfish on articles; the composition which comprises triisobutyltin hydroxide and an arylsulfonic acid derivative, both of the components being dissolved in an organic solvent.

The composition of the invention may additionally contain a phenol substituted by an alkyl radical and a chlorine atom (the substituted phenol is hereinafter referred to as a ACP compound), typically Raluben (a mixture of chlorodimethylphenols: tradename used by Dr' F' Raschigg-GmbH), and/or a pyridazine derivative.

When an article, typically a fishing net, is treated with the composition of the invention, the composition penetrates into the net and then, on drying, forms a triisobutyltin arylsulfonate therein as a result of a reaction between the triisobutyltin hydroxide and arylsulfonic acid derivative. The triisobutyltin arylsulfonic thus formed is insoluble in water and can exert an activity inhibiting adhesion and propagation of undesirable algae and/or shellfish on the net for a long period of time with no possibility of environmental pollution. Where the composition of the present invention is applied to an article of a nature into which the composition is not penetrable, such as an iron plate, a concrete or a plastic board (hereinafter referred to as an impenetrable article), a film of the composition of the invention is formed on the surface of the impenetrable article when and after the latter has been dipped into the composition and subsequently dried, which film gives the same effect as described above.

The composition of the present invention is prepared by dissolving triisobutyltin hydroxide, an arylsulfonic acid derivative and, if desired, the ACP compound and/or the pyridazine derivative in an appropriate solvent.

When the ACP compound and/or the pyridazine derivative is incorporated into the composition, the effect of inhibiting adhesion and propagation of undesirable algae and/or shellfish on an article and the solidity of the film which is formed on the surface of an article after the composition has been dried can be enhanced.

The term "an arylsulfonic acid derivative" is used to denote any arylsulfonic acid, an alkyl esters of such acid, is particularly a methyl or ethyl ester, an ammonium salt of such acid, or a mixture of these compounds. The arylsulfonic acid can be selected from all kinds of arylsulfonic acids. However, those having a relatively high molecular weight are preferred. Illustrative arylsulfonic acids are compounds of the formula:

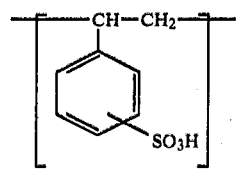

which can be prepared by sulfonation and polymerization of styrene (hereinafter referred to as "sulfonated styrene polymer"), compounds of the formula:

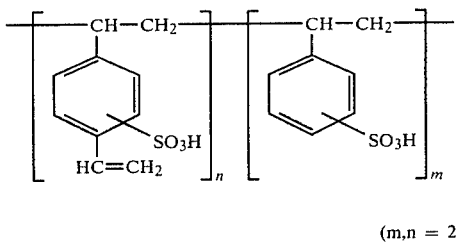

(m,n = 2-5)

which can be prepared by copolymerization of divinylbenzene and styrene followed by sulfonation, naphthalenes substituted by one or two sulfonic acid groups, dinaphthylmethanes substituted by one to four sulfonic acid groups, and alkylbenzenesulfonic acids. Among them, sulfonated styrene polymer (preferred molecular weight is 80,000 to 100,000) and alkylbenzenesulfonic acids, particularly dodecylbenzenesulfonic acid, are most preferred.

In place of the sulfonated styrene polymer, styrene sulfonic acid can be employed as the arylsulfonic acid component in the presence of a catalytic amount of a polymerization initiator (e.g., benzoyl peroxide). In this case, the sulfonated styrene polymer is formed when the composition of the invention containing the styrene sulfonic acid and the initiator is heated after it has been applied to a fishing net or an impenetrable article.

As pyridazine derivatives which may be optionally incorporated into the composition of the invention, pyridazines substituted by a hydroxyl group and/or a halogen atom, such as, 3-hydroxy-6-chloropyridazine, 3-hydroxy-6-bromopyridazine and 3,6-dichloropyridazine, and the ether compounds obtained by a reaction between one of the substituted pyridazines just mentioned and a ACP compound can be employed. However, the latter ether compounds are preferable.

As organic solvents, in which the aforementioned arylsulfonic acid derivative and triisobutyltin hydroxide and, if desired, the ACP compound and/or pyridazine derivative are dissolved, aromatic hydrocarbons, such as toluene, xylene or styrene; ketones, such as methyl ethyl ketone and methyl isobutyl ketone; and lower alcohols, such as methyl alcohol, ethyl alcohol, propyl alcohol, isopropyl alcohol and butyl alcohol, can be employed. Among them, isopropyl alcohol is particularly preferred when the composition comprising the same is used for the treatment of a fishing net.

The preferred weight ratio of the triisobutyltin hydroxide and the arylsulfonic acid derivative is such that triisobutyltin hydroxide: arylsulfonic acid derivative is 1:1 to 1:1.5. When the composition of the invention is used for the treatment of a fishing net, the weight ratio is preferred to be 1:1.5. On the other hand, it is preferred to be 1:1 in the case where the composition is used for the treatment of an impenetrable article.

The concentrations of the triisobutyltin hydroxide and the arylsulfonic acid derivative in the composition of the invention are each about 10% to about 40% by weight based on the weight of the composition. The lower concentration is preferred where the composition is applied to a fishing net, whereas the higher concentration is preferred where the composition is used for the treatment of an impenetrable article.

The amount of the ACP compound and the pyridazine derivative, both of which may be optionally incorporated into the composition of the invention, is below about 5% by weight based on the total weight of the composition.

When an arylsulfonic acid, i.e., a free acid, is employed as an arylsulfonic acid derivative component, a fishing net is conveniently treated with the composition containing the same in such a manner that the fishing net is dipped into the composition, which has been appropriately diluted, for a given period of time, for example, 5 minutes to a time extending over night, and thereafter air-dried.

On the contrary, in the case where an ester or an ammonium salt of an arylsulfonic acid is employed, as well as where styrene sulfonic acid is employed instead of the sulfonated styrene polymer, the fishing net, after dipping, must be heated at from 110° to 130° C. instead of being merely subjected to air-drying.

In both cases, however, the fishing net thus treated exhibits a great ability to restrain undesirable algae and/or shellfish from sticking and propagating thereon.

As aforementioned, the composition of the present invention can be used for the treatment of not only a fishing net but also an impenetrable article, such as an iron plate, a concrete or a plastic board which constitutes, for example, the hull or bilge of a boat, various culturing materials, a cooling-water pipe in a power station and various constructions in the ocean. In the latter case, an extremely solid film of the composition is formed on the surface of an article which has been dried or heated after the application of the composition, and the film exerts a remarkable inhibiting effect to prevent adhesion and propagation of undesirable algae and/or shellfish.

The composition of the invention can also be applied to an article after it has been incorporated into a coating composition. The weight ratio of the composition of the invention to a coating composition in the blend may usually be 1:4 to 1:9.

The following examples are provided to further illustrate the present invention and are not intended to limit the present invention.

EXAMPLE 1

20.0 parts by weight of triisobutyltin hydroxide and 30.0 parts by weight of methyl dodecylbenzenesulfonate are dissolved in 150.0 parts by weight of isopropyl alcohol at ambient temperature to give 200.0 parts by weight of the composition useful for the treatment of a fishing net. The composition is diluted with 600.0 parts by weight of a mixture of water and isopropyl alcohol (1:1 by weight). A fishing net is dipped into the diluted composition for five minutes and thereafter dried at about 110° C. to give a fishing net resistant to adhesion and propagation of undesirable algae and shellfish.

EXAMPLE 2

20.0 parts by weight of triisobutyltin hydroxide, 35.0 parts by weight of dodecylbenzenesulfonic acid, 8.0 parts by weight of Raluben and 7.0 parts by weight of 3-hydroxy-6-chloropyridazine are dissolved in 130.0 parts by weight of isopropyl alcohol at ambient temperature to give 200.0 parts by weight of the composition useful for the treatment of a fishing net. The composition is diluted with 600.0 parts by weight of a mixture of water and isopropyl alcohol (1:1 by weight). A fishing net is dipped into the diluted composition for five minutes and thereafter air-dried to give the fishing net resistant to adhesion and propagation of undesirable algae and shellfish.

EXAMPLE 3

A composition useful for the treatment of a fishing net is prepared in the same manner as in Example 2, using a reaction product between 3,6-dichloropyridazine and Raluben (obtainable by mixing the two components at room temperature in an aqueous sodium hydroxide solution) (m.p. 201°–203° C.) instead of 3-hydroxy-6-chloropyridazine.

EXAMPLE 4

A composition useful for the treatment of a fishing net is prepared in the same manner as in Example 2, using ammonium dodecylbenzenesulfonate instead of dodecylbenzenesulfonic acid. The composition thus obtained must be dried at about 110° C. after being applied to a fishing net.

EXAMPLE 5

20.0 parts by weight of triisobutyltin hydroxide, 20.0 parts by weight of dodecylbenzenesulfonic acid, 7.0 parts by weight of a reaction product between 3,6-dichloropyridazine and Raluben, and 8.0 parts by weight of Raluben are dissolved in 45.0 parts by weight of styrene at room temperature to give 100.0 parts by weight of the composition. The composition is conveniently used after being incorporated into a coating composition.

EXAMPLE 6

7.0 parts by weight of triisobutyltin hydroxide, 9.0 parts by weight of dodecylbenzenesulfonic acid and 1.0 part by weight of Raluben are dissolved in 15.0 parts by weight of butanol at room temperature to give 32.0 parts by weight of the composition to be used in the same manner as in Example 5.

EXAMPLE 7

7.0 parts by weight of triisobutyltin hydroxide, 9.0 parts by weight of dodecylbenzenesulfonic acid and 2.0 parts by weight of Raluben are dissolved in 13.0 parts by weight of methyl isobutyl ketone at room temperature to give 32.0 parts by weight of the composition intended to be used in the same manner as in Example 5.

EXAMPLE 8

7.0 parts by weight of triisobutyltin hydroxide, 9.0 parts by weight of dodecylbenzenesulfonic acid and 1.0 part by weight of Raluben are dissolved in 23.0 parts by weight of xylene at room temperature to give 40.0 parts by weight of a composition. The composition is used after shaking a receptacle containing the same in order to get the composition uniformly dispersed.

EXAMPLE 9

30.0 parts by weight of triisobutyltin hydroxide and 45.0 parts by weight of p-sulfonated styrene polymer (M.W. about 90,000) are dissolved in 125.0 parts by weight of isopropyl alcohol at ambient temperature to give 200.0 parts by weight of the composition useful for treatment of a fishing net. The composition is diluted with 600.0 parts by weight of a mixture of water and isopropyl alcohol (1:1 by weight). A fishing net is dipped into the diluted composition for five minutes and thereafter air-dried to give the fishing net resistance to adhesion and propagation of undesirable algae and shellfish.

EXAMPLE 10

A composition useful for the treatment of a fishing net is prepared in the same manner as in Example 9, except for the additional incorporation of 3-hydroxy-6-chloropyridazine into the composition.

EXAMPLE 11

30.0 parts by weight of triisobutyltin hydroxide and 45.0 parts by weight of p-styrene sulfonic acid are dissolved in 125.0 parts by weight of isopropyl alcohol, and a catalytic amount of benzoyl peroxide (about 0.1% by weight based on the total weight of the composition) is added to the mixture to give 200.0 parts by weight of the composition useful for the treatment of a fishing net. The composition is diluted with 600.0 parts by weight of a mixture of water and isopropyl alcohol (1:1 by weight). A fishing net is dipped into the diluted composition for five minutes and thereafter dried at about 110° C. to give the fishing net resistance to adhesion and propagation of undesirable algae and shellfish.

EXAMPLE 12

A composition useful for treatment of a fishing net is prepared in the same manner as in Example 11, except for the additional incorporation of a reaction product between 3,6-dichloropyridazine and Raluben into the composition.

EXAMPLE 13

10.0 parts by weight of p-sulfonated styrene polymer (M.W. about 90,000), 30.0 parts by weight of dodecylbenzene sulfonic acid, 30.0 parts by weight of triisobutyltin hydroxide and 5.0 parts by weight of a reaction product between 3,6-dichloropyridazine and Raluben are dissolved in 125.0 parts by weight of isopropyl alcohol at room temperature to give 200.0 parts by weight of composition useful for treatment of a fishing net. The composition is diluted with 600.0 parts by weight of a mixture of water and isopropyl alcohol (1:1 by weight) before it is used for treatment of a fishing net.

TEST 1

Two fishing nets which had been treated according to Examples 1 and 2, respectively, were allowed to stand in sea water for 29 days, and the growth of algae on the fishing nets was observed. An untreated fishing net was similarly tested as a control. A large amount of alga was detected on the control, a small amount was detected on the fishing net treated according to Example 1 and no growth of alga was seen on the fishing net treated according to Example 2.

What is claimed is:

1. A composition for inhibiting adhesion of undesirable algae and/or shellfish to and propagation thereof on articles, which composition comprises an organic solvent solution of (a) triisobutyltin hydroxide and (b) an arylsulfonic acid derivative and wherein the weight ratio of (a):(b) is from 1:1 to 1:1.5, (a) being reactive with (b) to form a water-insoluble reaction product.

2. A composition according to claim 1 further comprising in solution at least one member selected from the group consisting of (c) an alkyl-substituted chlorophenol and (d) a pyridazine derivative.

3. A composition according to claim 1 wherein the arylsulfonic acid derivative is at least one member selected from the group consisting of dodecylbenzenesulfonic cid, an alkyl ester thereof, ammonium salt thereof and sulfonated styrene polymer.

4. A composition according to claim 3 wherein the arylsulfonic acid derivative is sulfonated styrene polymer having a molecular weight of from 80,000 to 100,000.

5. A composition according to claim 1 wherein the concentration of each of (a) and (b) is from 10 to 40 percent by weight, based on the total weight of the composition.

6. A composition according to claim 5, wherein the organic solvent is a member selected from the group consisting of isopropyl alcohol, methyl isobutyl ketone, butyl alcohol, styrene, toluene and xylene.

7. A composition according to claim 2, wherein the pyridazine derivative is a member selected from the group consisting of 3-hydroxy-6-chloropyridazine, 3-hydroxy-6-bromopyridazine, 3,6-dichloropyridazine and a 3,6-dichloropyridazine/chlorodimethylphenol reaction product.

8. A composition according to claim 7, wherein the pyridazine derivative is 3-hydroxy-6-chloropyridazine.

9. A composition according to claim 1 further comprising a 3,6-dichloropyridazine/chlorodimethylphenol reaction product.

10. A fishing net impregnated with a composition according to claim 6, 7, 8, 1, 2, 3, 4, 5 or 9.

11. In a coating composition for an article which is normally subject to adhesion by and propagation of algae and/or shellfish, an adhesion and propagation inhibiting amount of a composition according to claim 6, 7, 8, 1, 2, 3, 4, 5 or 9.

12. A water-insoluble (triisobutyltin hydroxide)/(arylsulfonic acid derivative) reaction product which inhibits adhesion of algae and/or shellfish to and propagation thereof on articles to which it is applied.

13. An article having a surface which is normally subject to adhesion by and propagation of algae and/or shellfish, the surface being coated with and/or permeated by a reaction product according to claim 12.

14. A process for treating an article to impart to the article an ability to inhibit adhesion and propagation of undesirable algae and/or shellfish thereon, which comprises dipping the article into a composition according to claim 6, 7, 8, 1, 2, 3, 4, 5 or 9, and thereafter drying the article.

* * * * *